United States Patent
Vaddadi et al.

(10) Patent No.: US 11,765,205 B2
(45) Date of Patent: *Sep. 19, 2023

(54) OMNI-CHANNEL END-POINT SECURITY

(71) Applicant: NCR Corporation, Atlanta, GA (US)

(72) Inventors: Ramesh Vaddadi, Andhra Pradesh (IN); Krishna Kumari Rudraraju, Telangana (IN)

(73) Assignee: NCR Corporation, Atlanta, GA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/458,870

(22) Filed: Aug. 27, 2021

(65) Prior Publication Data

US 2021/0392169 A1  Dec. 16, 2021

Related U.S. Application Data

(63) Continuation of application No. 15/957,379, filed on Apr. 19, 2018, now Pat. No. 11,146,590.

(51) Int. Cl.
| | |
|---|---|
| *H04L 9/40* | (2022.01) |
| *G06F 8/61* | (2018.01) |
| *G06F 9/445* | (2018.01) |
| *G06F 21/64* | (2013.01) |
| *G06F 21/57* | (2013.01) |

(52) U.S. Cl.
CPC .......... *H04L 63/20* (2013.01); *G06F 21/572* (2013.01); *G06F 21/645* (2013.01); *H04L 63/18* (2013.01); *G06F 8/61* (2013.01); *G06F 9/44505* (2013.01)

(58) Field of Classification Search
CPC ....... H04L 63/20; H04L 63/18; G06F 21/572; G06F 21/645; G06F 21/57; G06F 8/61; G06F 8/65; G06F 9/44505; H04W 12/033; H04W 12/37
See application file for complete search history.

(56) References Cited

U.S. PATENT DOCUMENTS

| | | | | |
|---|---|---|---|---|
| 7,020,842 B1 * | 3/2006 | DeStefano | .............. | G06F 9/453 |
| | | | | 715/708 |
| 8,683,598 B1 * | 3/2014 | Cashin | .................... | H04L 63/20 |
| | | | | 713/188 |
| 10,423,793 B2 * | 9/2019 | Madou | ................ | G06F 11/3612 |
| 10,560,432 B1 * | 2/2020 | Moore | .................. | G06F 9/4862 |
| 2004/0034764 A1 * | 2/2004 | Bulusu | .................. | G06F 9/4406 |
| | | | | 713/1 |
| 2006/0107255 A1 * | 5/2006 | Chagoly | ............. | G06F 11/3495 |
| | | | | 714/E11.202 |
| 2006/0259964 A1 * | 11/2006 | Maldonado | ........... | G06F 21/604 |
| | | | | 726/16 |

(Continued)

OTHER PUBLICATIONS

Symantec. "Installation Guide for Symantec Endpoint Protection and Symantec Network Access Control", 2008. (Year: 2008).*

*Primary Examiner* — Michael Simitoski

(74) *Attorney, Agent, or Firm* — Schwegman Lundberg & Woessner, P.A.

(57) ABSTRACT

An Omni-channel security manager is provided. The Omni-channel security manager is configured to: receive selections for domain/channel specific security applications and deploy security agents to end-point devices. The security agents interact with the Omni-channel security manager to install, initiate, manage, and monitor the domain/channel specific security applications on the end-point devices.

18 Claims, 4 Drawing Sheets

(56) References Cited

U.S. PATENT DOCUMENTS

| | | | |
|---|---|---|---|
| 2007/0180152 A1* | 8/2007 | Montanez | H04L 63/1416 709/250 |
| 2009/0037284 A1* | 2/2009 | Lewis | G06Q 20/202 705/16 |
| 2009/0165132 A1* | 6/2009 | Jain | G06F 21/554 726/22 |
| 2010/0049559 A1* | 2/2010 | Carbone | G06Q 10/06395 705/7.41 |
| 2010/0162347 A1* | 6/2010 | Barile | G06F 21/552 726/1 |
| 2011/0231361 A1* | 9/2011 | Patchava | G06F 21/577 707/602 |
| 2013/0054682 A1* | 2/2013 | Malik | H04L 45/563 709/203 |
| 2013/0219493 A1* | 8/2013 | Banzhof | G06F 21/567 726/22 |
| 2014/0215226 A1* | 7/2014 | Litty | G06F 21/53 713/193 |
| 2014/0283012 A1* | 9/2014 | Eggerton | G06F 21/31 726/19 |
| 2015/0113258 A1* | 4/2015 | Grieco | G06F 21/572 713/2 |
| 2015/0244735 A1* | 8/2015 | Kumar | G06F 21/51 726/23 |
| 2016/0014161 A1* | 1/2016 | Sato | H04L 63/083 726/1 |
| 2016/0162668 A1* | 6/2016 | Yamazaki | G06F 21/105 726/28 |
| 2016/0173450 A1* | 6/2016 | Mircescu | H04L 41/22 726/14 |
| 2016/0191567 A1* | 6/2016 | Chahal | G06F 21/44 726/1 |
| 2016/0323106 A1* | 11/2016 | Roper | G06F 21/57 |
| 2017/0010875 A1* | 1/2017 | Martinez | G06F 21/60 |
| 2017/0116413 A1* | 4/2017 | Takacs | G06F 21/554 |
| 2017/0331859 A1* | 11/2017 | Bansal | H04L 63/029 |
| 2017/0339564 A1* | 11/2017 | Momchilov | H04W 4/50 |
| 2018/0295134 A1* | 10/2018 | Gupta | H04L 67/02 |
| 2018/0302409 A1* | 10/2018 | Hope | G06F 21/6281 |
| 2018/0324195 A1* | 11/2018 | Gupta | G06F 21/566 |
| 2019/0050234 A1* | 2/2019 | Segal | G06F 1/12 |
| 2019/0081982 A1* | 3/2019 | Breton | G06F 21/57 |
| 2020/0074435 A1* | 3/2020 | Baar | G06Q 20/3829 |
| 2020/0137107 A1* | 4/2020 | Jevans | G06F 21/577 |

\* cited by examiner

OMNI-CHANNEL END-POINT SECURITY

CROSS-REFERENCE TO RELATED APPLICATION

This application is a continuation of U.S. patent application Ser. No. 15/957,379, filed Apr. 19, 2018, which application and publication is incorporated herein by reference in its entirety.

BACKGROUND

Security is of utmost concern across all industries. A day does not go by without a major announcement that some company has had a data breach and customers' confidential information was compromised. Companies are now facing legal scrutiny for inadequately providing security to protect electronic assets.

Security is even a greater concern for Self-Service Terminals (SSTs, such as Automated Teller Machines (ATMs)) that dispense currency to customers. An ATM, if compromised, can be depleted of currency or can expose customers' account information.

The issue for enterprises is that each domain or communication channel that the enterprise engages in business through requires its own unique security processing. Such that, a security product in one domain is unusable and not portable to a different domain; the different domain utilizes its own separate and unique security product.

This problem is confounded because security must exists end-to-end for any enterprise domain. That is, security is needed for any particular enterprise domain: on the customer-facing device, through any network connection of the customer-facing device, and the back-end server that communicates over the network connection with the customer-facing device.

Maintaining all these security products is expensive and labor intensive, requiring many skilled technicians for likely each domain of the enterprise. Additionally, security breaches can result in downtime for customer-facing devices, which means revenues can be adversely impacted because customer are unable to access the enterprise devices during a downtime.

Therefore, what is needed is improved Omni-channel (domain) end-point security for enterprises.

SUMMARY

In various embodiments, methods and a system for Omni-channel end-point security are presented.

According to an embodiment, a method for Omni-channel end-point security processing is presented. More particularly, a selection is received for a security application and an end-point device. The security application is configured for the end-point device as a domain/channel specific security application for a domain/channel associated with the end-point device. A security agent is deployed to the end-point device, the security agent installs and initiates the domain/channel specific security application on the end-point device.

DETAILED DESCRIPTION

Figure 1:
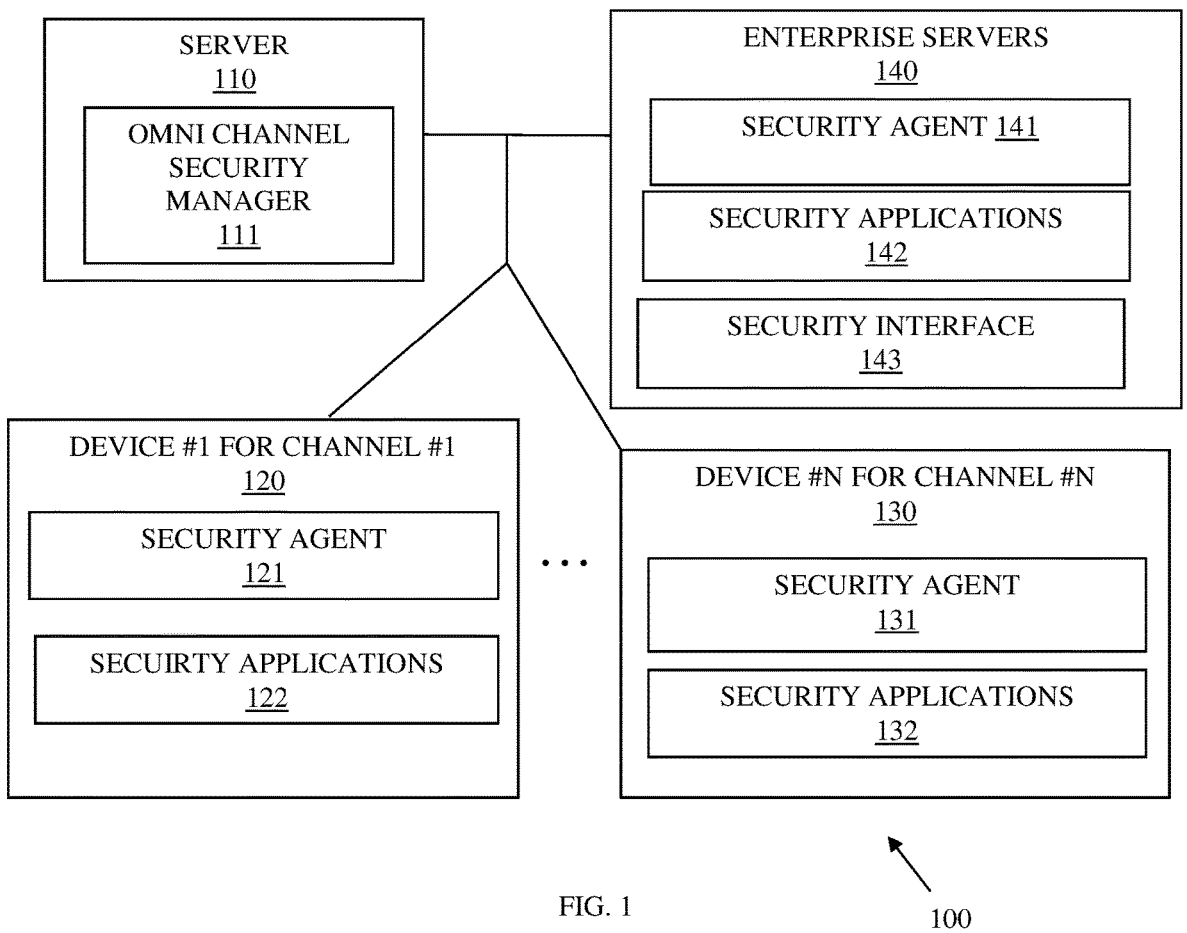
FIG. 1 is a diagram of a system for Omni-channel end-point security processing, according to an example embodiment.

FIG. 1 is a diagram of a system 100 for Omni-channel end-point security processing, according to an example embodiment. The various components are illustrated and the arrangement of the components is presented for purposes of illustration only. It is to be noted that other arrangements with more or less components are possible without departing from the Omni-channel end-point security teachings presented herein and below.

The techniques, methods, and system presented herein and below for Omni-channel end-point security processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein the phrases "Omni-channel," refers to processing that extends across multiple communication channels or processing domains. The channels can include communication and processing on: a Self-Service Terminal (SST), an Automated Teller Machine (ATM), a kiosk (travel, restaurant, hotel, grocery store, retailer, etc.), a Point-Of-Sale (POS) terminal operated by a clerk to checkout a customer at an enterprise, a mobile device operated by a customer, a server, a cloud processing environment, and the like.

The system 100 includes: a server 110 having an Omni-channel security manager 111 and a plurality of devices 120 and 130, each device 120 and 130 operating over a specific communication channel or domain. Each device 120 and 130 including a security agent 121 or 131 and a plurality of security applications 122 or 132. The system 100 also includes a plurality of enterprise services 140, each enterprise server 140 including a security agent 141, security applications 142, and a security interface 142.

The Omni-channel security manager 111 is configured to deploy the security agents 121 and 131 to the devices 120 and 130, respectively. The security agents 121 and 131 independently enforce security on their respective devices 120 and 130 and interact with the Omni-channel security manager 111 for enforcing security when interacting with the server 110 and enterprise servers 140.

Initially, the security interface 142 is operated by enterprise personnel to identify the security applications 122, 132, and 141 and to identify devices 120 and 130 with the Omni-channel security manager 111. The security interface 142 permits selection from a plurality of security applications to be made; the selection identifies the security applications 122, 132, and 142. Each security application (122, 132, 142) representing a specific type of desired end-point security being requested by the enterprise through the security interface 143.

The plurality of security applications available for selection as the security applications (122, 132, and 142) can include, by way of example on: device hardening (lock down menu, operations, and windows selectable and viewable from the devices 120 and 130), application/device whitelisting (security that is based on an identifier for a valid application/device (which can process or access the devices 120 and 130) being present in a whitelist file on the devices 120 and 130), device hard disk encryption, Binary Input/Output System (BIOS) remote and secure management including remote BIOS updating, operation or transaction validation through hashing algorithms and validation, and any other available security application being used or desired by the enterprise over the devices 120 and 130 and the domains (channels).

It is noted that in some instances the security applications 122 and 132 process on a processor of a peripheral device that is integrated into or interfaced with the devices 120 and 130. For example, a cash dispenser integrated into an ATM (device 120 or 130) that utilizes a custom transaction-based hashing algorithm for transactions to validate a dispense command to dispense currency from a safe of the ATM. The hashing algorithm and validation processing representing a particular security application 122 or 132.

The security interface 142 also permits the enterprise personnel to configure the security applications 122, 132, and 142, such as for generating encryption and decryption keys processed by the security applications 122, 132, and 142. Configuration can also identify wherein in a process flow the security applications 122, 132, and 142 are to enforce their security on the devices 120, 130, and 140. For example, processed when the device boots, as a pre-boot process within the BIOS, when a specific operation is attempted to be processed, during a transaction process flow, etc.

Once the security applications 122, 132, and 142 are selected and configured through the interface 143, the Omni-channel security manager 111 causes the security agents 121, 131, and 141 to be deployed and installed on the devices 120, 130, and 140. Once deployed, each security agent 121, 131, and 141 interacts with the Omni-channel security manager 111 to obtain the security applications 122, 132, and 142 and install the security applications 122, 132, and 142 on their respective devices 120, 130, and 140.

The security agents 121, 131, and 141 also report security audit information, receive updates to the application 122, 132, and 142 from the Omni-channel security manager 111, and monitor the applications 122, 132, and 142.

The security agents 121, 131, and 141 may also be responsible for dynamically checking the digital signatures or checksum values associated with each of the applications 122, 132, and 142 processing on their respective devices 120, 130, and 140. The security agents 121, 131, and 141 can remove any application 122, 132, and 142 from memory of the devices 120, 130, and 140 when signatures or checksum values are unable to be validated and shutdown operation of other processes on the devices 120, 130, and 140. In some situations, if checksum or signatures are corrupted and depending on the security application 122, 132, and 142, the agents 121, 131, and 141 may shut down the device 120, 130, and 140.

It is noted that an enterprise may also obtain (as mentioned above) security applications 142 for its servers 140 through the security interface 143 and the Omni-channel security manager 111.

Each endpoint device 120, 130, and 140 of an enterprise can custom select, custom configure, and custom deploy desired security applications 122, 132, and 142. The security applications 122, 132, and 142 are monitored and managed by the security agents 121, 131, and 141.

The system 100 allows an enterprise to custom manage and deploy security applications 122, 132, and 142 across a plurality of channels/domains (120, 130, and 140) with a single point of management through the Omni-channel security manager 111. This can substantially reduce enterprise staff and expense associated with maintaining enterprise security and permit security products (applications 122, 132, and 142) to be properly configured and deployed to different enterprise channels or domains through the Omni-channel security manager 111. Thus, security applications 122, 132, and 142 can be leveraged and used across domains (Omni-channel).

These embodiments and other embodiments are now discussed with reference to the FIGS. 2-4.

Figure 2:
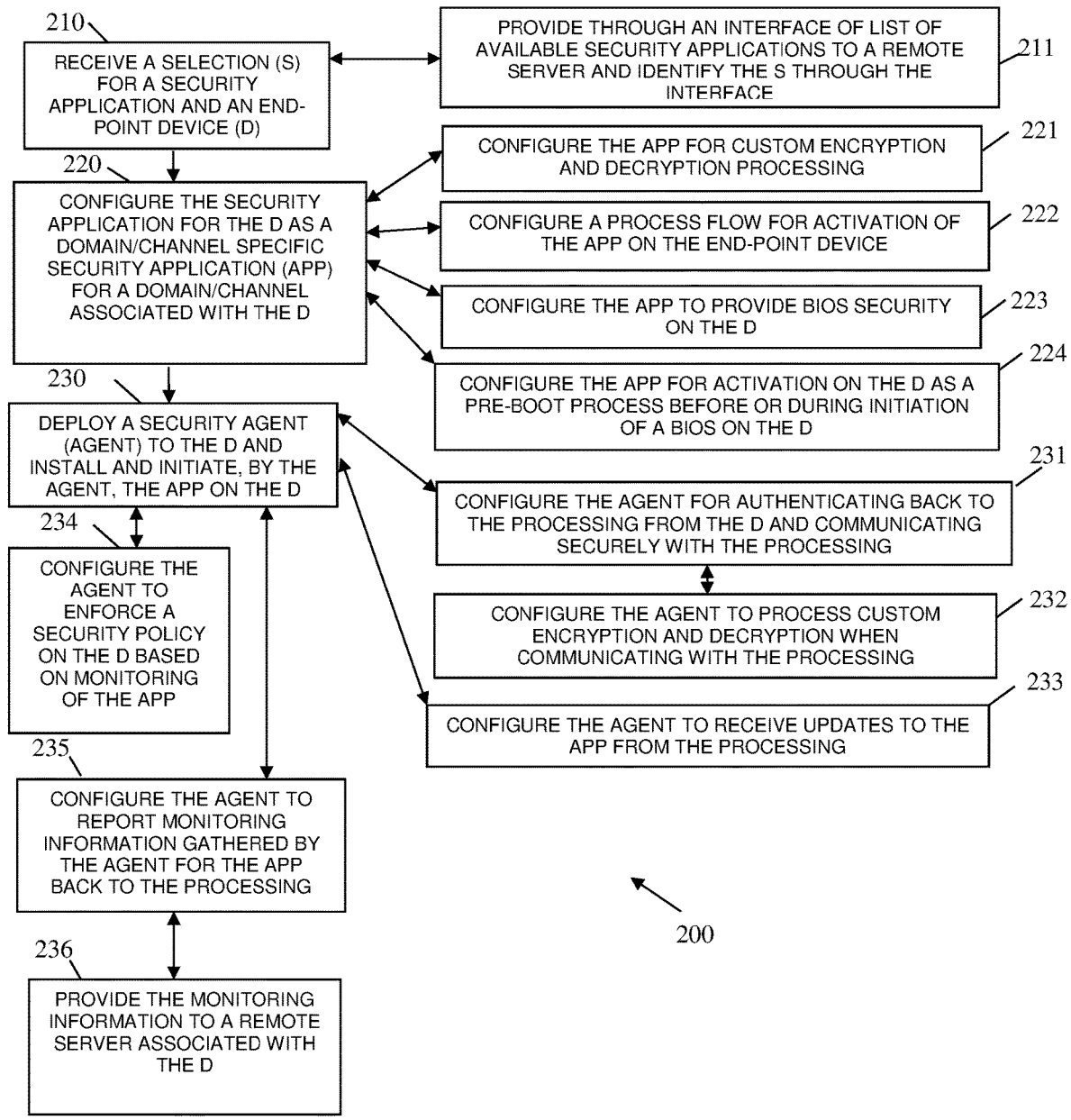
FIG. 2 is a diagram of a method for Omni-channel end-point security processing, according to an example embodiment.

FIG. 2 is a diagram of a method 200 for Omni-channel end-point security processing, according to an example embodiment. The software module(s) that implements the method 200 is referred to as an "Omni-channel security manager." The Omni-channel security manager is implemented as executable instructions programmed and residing within memory and/or a non-transitory computer-readable (processor-readable) storage medium and executed by one or more processors of a device. The processor(s) of the device that executes the Omni-channel security manager are specifically configured and programmed to process the c Omni-channel security manager. The Omni-channel security manager has access to one or more networks during its processing. The networks can be wired, wireless, or a combination of wired and wireless.

In an embodiment, the Omni-channel security manager is the Omni-channel security manager 111.

In an embodiment, the device that executes the Omni-channel security manager is the server 120.

In an embodiment, the device that executes the Omni-channel security manager is a plurality of servers logically organized as a cloud processing environment.

At 210, the Omni-channel security manager receives a selection for a security application and an end-point device. This can be through an interface with an enterprise server that is associated with the end-point device.

According to an embodiment, at 211, the Omni-channel security manager provides, through an interface, a list of available security applications to a remote server (operated by a user). The Omni-channel security manager identifies the selection through the interface based on actions taken by the user at the remote server.

At 220, the Omni-channel security manager configures the security application for the end-point device as a domain/channel specific security application for a domain/channel associated with the end-point device.

In an embodiment, at 221, the Omni-channel security manager configures the domain/channel specific security application for custom encryption and decryption processing.

In an embodiment, at 222, the Omni-channel security manager configures a process flow for activation of the domain/channel specific security application on the end-point device. This was discussed above with the description of the FIG. 1 and the system 100.

In an embodiment, at 223, the Omni-channel security manager configures the domain/channel specific security application to provide BIOS security on the end-point device.

In an embodiment, at 224, the Omni-channel security manager configures the domain/channel specific security application for activation on the end-point device as a pre-boot process before or during initiation of a BIOS on the end-point device.

At 230, the Omni-channel security manager deploys a security agent to the end-point device. Once deployed and initiated on the end-point device, the security agent installs and initiates the domain/channel specific security application on the end-point device.

In an embodiment, at 231, the Omni-channel security manager configures the security agent for authenticating back to the Omni-channel security manager from the end-point device and communicating securely with the Omni-channel security manager from the end-point device.

In an embodiment of 231 and at 232, the Omni-channel security manager configures the security agent to process custom encryption and decryption when communicating with the Omni-channel security manager.

In an embodiment, at 233, the Omni-channel security manager configures the agent to receive and install updates to the domain/channel specific security application that are received from the Omni-channel security manager.

In an embodiment, at 234, the Omni-channel security manager configures the security agent to enforce a security policy based on monitoring of the domain/channel specific security application.

In an embodiment, at 235, the Omni-channel security manager configures the security agent to report monitoring information gathered by the security agent for the domain/channel specific application back to the Omni-channel security manager.

In an embodiment of 235 and at 236, the Omni-channel security manager provides the monitoring information to a remote server associated with the end-point device.

Figure 3:
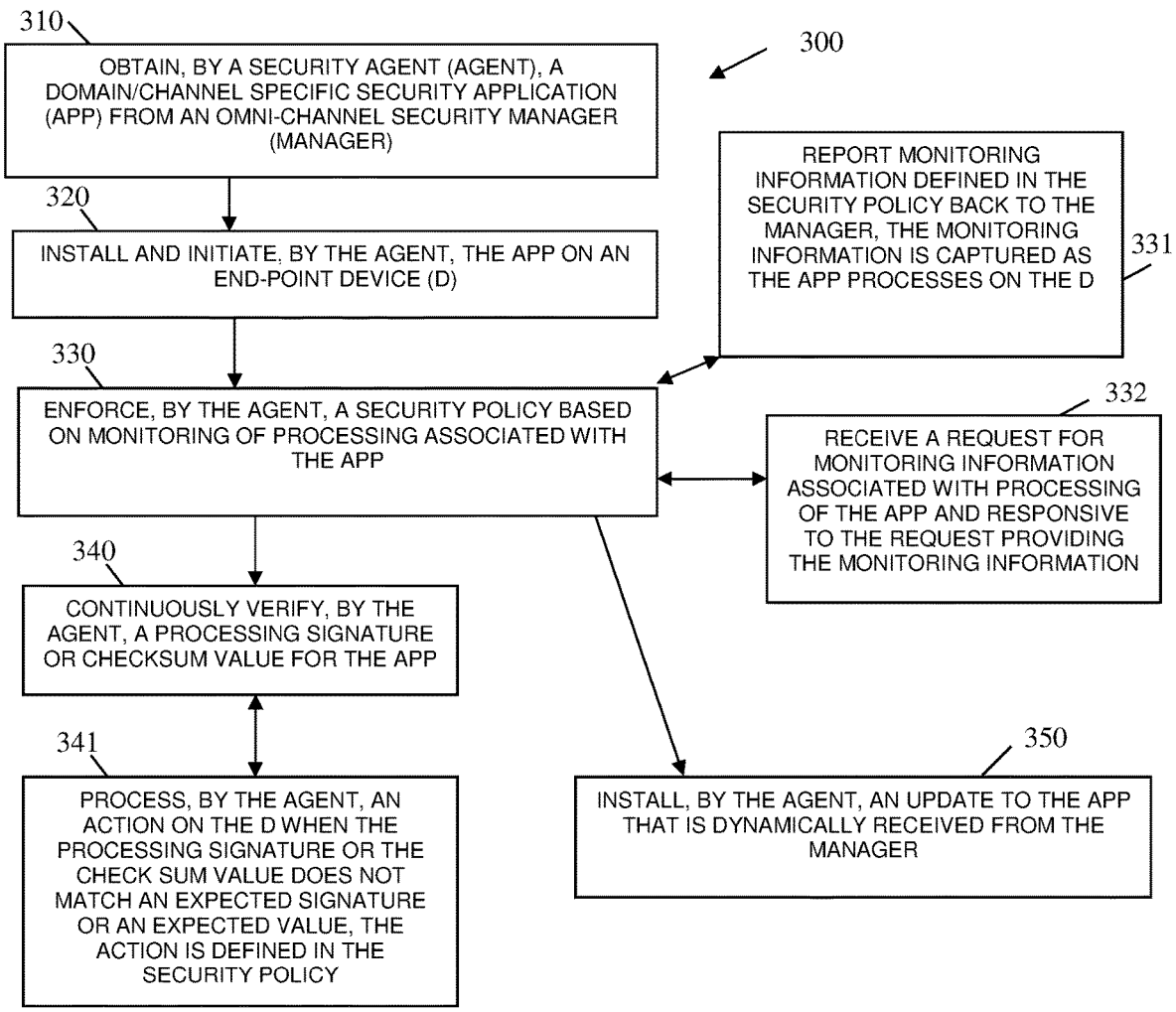
FIG. 3 is a diagram of another method for Omni-channel end-point security processing, according to an example embodiment.

FIG. 3 is a diagram of another method 300 for Omni-channel end-point security processing, according to an example embodiment. The software module(s) that implement the method 300 is referred to herein as a "security agent." The security agent is implemented as executable instructions and programmed within memory and/or a non-transitory computer-readable (processor-readable) storage medium that executes on one or more processors of a device. The processors of the device are specifically configured to execute the security agent. The security agent has access one or more networks; the networks can be wired, wireless, or a combination of wired and wireless.

In an embodiment, the security agent is one of: 121, 131, and 141.

In an embodiment, the device that executes the security agent is one of: device 120, device 130, and device 140.

Multiple independently custom configured instances of the security agent process within a networked environment. Each instance of the security agent responsible of a single end-point device of the network environment and configured for a domain/channel associated with that single end-point device.

The security agent is initially deployed by the Omni-channel security manager 111 or the method 200 to the device (channel or domain) that the security agent is responsible for monitoring and managing security on.

At 310, the security agent obtains a domain/channel specific security application from an Omni-channel security manager, such as the Omni-channel security manager 111 and/or the method 200.

At 320, the security agent installs and initiates for execution the domain/channel specific application on an end-point device (the same device that is executing the security agent).

At 330, the security agent enforces a security policy based on monitoring of the processing associated with the domain/channel specific security application. The security policy defining monitored information captured for the domain/channel specific security application and processing actions that the security agent is to process in response thereto.

In an embodiment, at 331, the security agent reports monitoring information defined in the security policy back to the Omni-channel security manager. The monitoring information is captured as the domain/channel specific security application processes on the end-point device.

In an embodiment, at 332, the security agent receives a request for monitoring information associated with the processing of the domain/channel specific security application and responsive to the request, the security agent provides the monitoring information to the Omni-channel security manager and/or an enterprise server associated with the end-point device (this is an on-demand request for the monitoring information processed by the security agent).

According to an embodiment, at 340, the security agent continuously verifies a digital processing signature or a checksum value for the domain/channel specific security application. This was discussed above with the FIG. 1 and the system 100.

In an embodiment of 340 and at 341, the security agent processes an action on the end-point device when the digital processing signature or the check sum value does not match an expected signature or an expected value for the domain/channel specific security application. The action is defined in the security policy. This can include a variety of actions discussed above with the FIG. 1 and the system 100, such as shutting down the end-point device, killing the processing instance of the domain/channel specific security application and the like.

In an embodiment, at 350, the security agent installs an update to the domain/channel specific security application that is dynamically received from the Omni-channel security manager.

Figure 4:
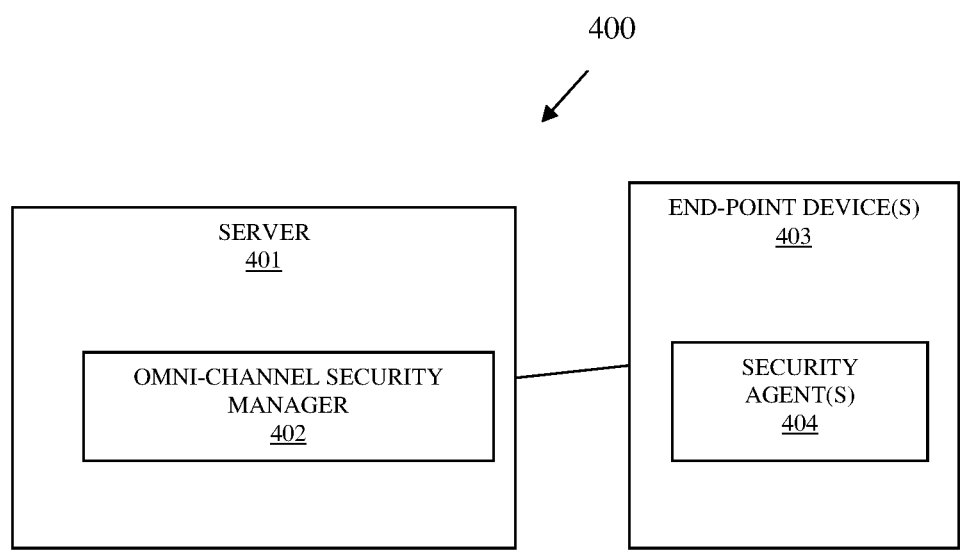
FIG. 4 is a diagram of another system for Omni-channel end-point security processing, according to an example embodiment.

FIG. 4 is a diagram of another system 400 for Omni-channel end-point security processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401 having an Omni-channel security manager 402 and at least one end-point device 403 having a security agent 404.

In an embodiment, the server 401 is the server 120.

In an embodiment, the server 401 is a part of a cloud processing environment.

In an embodiment, the Omni-channel security manager 402 is the Omni-channel security manager 111.

In an embodiment, the Omni-channel security manager 402 is the method 200.

In an embodiment, the at least one end-point device 403 is one or more of devices 120, 130, and 140.

In an embodiment, the security agent 404 is one of: security agents 121, 131, and 141.

In an embodiment, the security agent 404 is the method 300.

The Omni-channel security manager 402 executes on at least one hardware processor of the server 401 and is configured to: (i) receive a selection to a security application for the at least one end-point device 403, (ii) configure the security application as a domain/channel specific security application associated with a domain/channel associated with the at least one end-point device 403, and (iii) deploy the security agent 404 to the at least one end-point device 403.

The security agent 404 is executes on at least one hardware processor of the at least one end-point device 403 and is configured to: (i) obtain the domain/channel specific security application from the Omni-channel security manager 402 once deployed to the at least one end-point device 403, (ii) initiate the domain/channel specific security application on the at least one end-point device 403, and (iii) enforce a security policy in response to monitoring processing of the domain/channel specific security application on the at least one end-point device 403.

In an embodiment, the at least one end-point device 403 is one or more of: a SST (ATM, etc.), a POS terminal, a kiosk (travel, kitchen, restaurant, hotel, etc.), a mobile device, a network-voice enabled appliance, and a device that is part of the Internet-Of-Things (IoTs).

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
 receiving a selection that identifies a security application, a domain/channel, and an endpoint device;
 configuring a process flow of the security application to identify within the process flow where a security operation is to be enforced by the endpoint device during transaction process flows for transactions processed on the endpoint device over the domain/channel;
 deploying a security agent to the endpoint device that initiates the security application on the endpoint device; and
 monitoring the security application for the domain/channel during the transactions.

2. The method of claim 1, wherein receiving further includes providing a list of available security applications for inclusion in the selection through an interface, wherein the list comprises device hardening operations, application/device authorized operations by application/device identifiers, and device hard disk encryption operations.

3. The method of claim 2, wherein receiving further includes identifying the endpoint device as a peripheral device interfaced to a different device as a peripheral of that different device.

4. The method of claim 3, wherein configuring further includes receiving encryption and decryption keys through the interface and further configuring the security application for encryption and decryption utilizing the encrypting and decryption keys.

5. The method of claim 2, wherein deploying further includes configuring the security agent to receive and to process updates made to the security application on the endpoint device.

6. The method of claim 5, wherein deploying further includes configuring the security agent to check a digital signature of the security application.

7. The method of claim 6, wherein deploying further includes configuring the security agent to remove the security application from the endpoint device when the digital signature of the security application cannot be verified by the security agent.

8. The method of claim 1, wherein deploying further includes configuring the security agent to report security audit information for the security application and the domain/channel for use in the monitoring.

9. The method of claim 1, wherein deploying further includes configuring the security agent to shutdown the endpoint device when the digital signature of the security application cannot be verified by the security agent.

10. The method of claim 1 further comprising, processing the receiving, the configuring, the deploying, and the monitoring as a single point of management of an enterprise for the security application of the domain/channel and other security applications associated with other domains/channels.

11. A method, comprising:
 providing an interface to an enterprise;
 receiving a security application associated with a domain/channel and an endpoint device of the enterprise through the interface;
 receiving a location within a process flow of the security application that a security operation is to be processed through the interface during transactions processed within transaction flows on the endpoint device over the domain/channel;
 configuring the process flow of the security application to process the security operation for the transactions on the endpoint device over the domain/channel;
 configuring a security agent to install and activate the security application on the endpoint device; and
 deploying the security agent to the endpoint device.

12. The method of claim 11 further comprising, monitoring the transactions of the domain/channel through the security application.

13. The method of claim 11, wherein configuring the security agent further includes configuring the security agent to dynamically receive and install updates to the security application on the endpoint device.

14. The method of claim 11, wherein configuring the security agent further includes configuring the security agent to verify a digital signature of the security application during boots of the endpoint device.

15. The method of claim 11, wherein configuring the security agent further includes configuring the security agent to capture audit information for the security application and to report the audit information.

16. The method of claim 11, wherein configuring the security agent further includes configuring the security agent to remove the security agent and shutdown the endpoint device when the security agent is unable to verify a digital signature for the security application.

17. The method of claim 11 further comprising, monitoring the security application during the transactions over the domain/channel through reporting by the security agent.

18. The method of claim 17 further comprising, instructing the security agent to update and re-initiate the security application based on the monitoring.

* * * * *